(12) United States Patent
Shimizu et al.

(10) Patent No.: US 7,595,960 B2
(45) Date of Patent: Sep. 29, 2009

(54) THIN FILM MAGNETIC HEAD HAVING HEATING ELEMENT

(75) Inventors: Yoshiaki Shimizu, Niigata-ken (JP); Akira Takahashi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 451 days.

(21) Appl. No.: 11/486,797

(22) Filed: Jul. 14, 2006

(65) Prior Publication Data

US 2007/0019325 A1    Jan. 25, 2007

(30) Foreign Application Priority Data

Jul. 20, 2005   (JP) ............................. 2005-210073

(51) Int. Cl.
   *G11B 5/31* (2006.01)
(52) U.S. Cl. .................................... 360/126
(58) Field of Classification Search ................ 360/126, 360/128, 234.5, 294.7
   See application file for complete search history.

(56) References Cited

U.S. PATENT DOCUMENTS

| 7,113,369 B2 * | 9/2006 | Ota et al. ................. 360/234.5 |
| 7,184,246 B2 * | 2/2007 | Sasaki et al. ............. 360/294.7 |
| 7,187,521 B2 * | 3/2007 | Yamanaka et al. .......... 360/128 |
| 2004/0240109 A1 * | 12/2004 | Hamann et al. ............. 360/126 |
| 2005/0030666 A1 * | 2/2005 | Sasaki et al. ................ 360/128 |
| 2005/0190494 A1 * | 9/2005 | Lee et al. .................... 360/126 |
| 2006/0034013 A1 * | 2/2006 | Kato et al. .................. 360/128 |

FOREIGN PATENT DOCUMENTS

| JP | 10-261248 | 9/1998 |
| JP | 2003-168274 | 6/2003 |
| JP | 2005-11413 | 1/2005 |
| JP | 2005-11414 | 1/2005 |
| JP | 2005-050511 | 2/2005 |
| JP | 2005-056509 | 3/2005 |

OTHER PUBLICATIONS

Melting Point Alloy, From Web Site, Before 2005.*
Notification of Reasons for Refusal for corresponding Japanese Patent Application Serial No. 2005-2010073 dated May 29, 2007.

* cited by examiner

*Primary Examiner*—Mark Blouin
(74) *Attorney, Agent, or Firm*—Brinks Hofer Gilson & Lione (57) ABSTRACT

A thin film magnetic head is provided. The thin film magnetic head includes a read head and a write head, a heating element, or the combination thereof. The heating element includes a heating conductor layer and a high-melting-point-material layer disposed so as to at least partially overlap the heating conductor layer. Electromigration in the heating conductor layer can be suppressed.

11 Claims, 12 Drawing Sheets

FIG. 19

THIN FILM MAGNETIC HEAD HAVING HEATING ELEMENT

This application claims the benefit of Japanese Patent Application No. 2005-210073 filed on Jul. 20, 2005, which is hereby incorporated by reference.

BACKGROUND

1. Field

A thin film magnetic head in which the surfaces of a read head and a write head facing a recording medium protrude toward the recording medium by means of thermal expansion is provided.

2. Related Art

Japanese Unexamined Patent Application Publication Nos. 2005-11413, 2005-11414, and 2003-168274 (Patent Documents 1 to 3) each propose a thin film magnetic head that includes a heating element provided therein and in which the magnetic gap and its vicinity are thermally expanded and the surface facing a recording medium is allowed to protrude toward the recording medium so that the floating height of the thin film magnetic head can be decreased. Japanese Unexamined Patent Application Publication No. 10-261248 (Patent Document 4) also discloses a related technique.

In order to appropriately control the amount of heat from the heating element, it is important to suppress the occurrence of electromigration in the heating element and to reduce the temperature dependency of the rate of change in resistance of the heating element. The temperature coefficient of resistance (TCR) can be obtained from the change in resistance with temperature, and the term "to reduce the temperature dependency of the rate of change in resistance" means to decrease the absolute value of the temperature coefficient of resistance (TCR).

The patent documents described above do not mention measures against electromigration and the temperature coefficient of resistance (TCR).

The electromigration easily occurs when current is applied to the heating element continuously for a long period of time. The occurrence of the electromigration markedly varies the resistance of the heating element. When the temperature dependency of the rate of change in resistance is large, the resistance of the heating element is markedly changed by the change in environmental temperature.

If the resistance of the heating element is markedly changed due to the current application time, environmental temperature, and the like, the amount of heat generated from the heating element markedly varies. Consequently, the amounts of thermal expansion of the magnetic gap, the core layer, and the like vary, resulting in an increase in the fluctuation in the amount of protrusion of the surface facing the recording medium. Such a fluctuation in the amount of protrusion is likely to increase the fluctuation in the write efficiency and read efficiency of the thin film magnetic head. In the worst case, if the amount of protrusion of the surface facing the recording medium becomes excessively large, the thin film magnetic head is likely to collide with the recording medium.

SUMMARY

A thin film magnetic head includes at least one of a read head and a write head, and a heating element that allows the surface of at least one of the read head and the write head that faces a recording medium to protrude toward the recording medium. The heating element includes a heating conductor layer and a high-melting-point-material layer disposed so as to at least partially overlap the heating conductor layer. The high-melting-point-material layer has a melting point higher than that of the heating conductor layer.

Because of the structure described above, the heating conductor layer does not easily cause electromigration compared with heating conductor layers formed by the existing techniques. It is possible to appropriately suppress an increase in the resistance caused by the occurrence of electromigration.

Preferably, the high-melting-point-material layer is disposed on a lower surface, an upper surface of the heating conductor layer, or the combination thereof. The high-melting-point-material layer and the heating conductor layer can be easily formed in a layered manner.

The high-melting-point-material layer is composed of at least one element selected from the group consisting of platinum group elements, for example, (Ru, Rh, Pd, Os, Ir, and Pt), Ta, Ti, Cr, Nb, and Mo. The heating conductor layer is composed of, for example, NiCu, CuMn, NiFe, W, NiCr, or CrCu. By selecting at least one element from the group described above for the high-melting-point-material layer, electromigration of the heating element can be adequately suppressed. By selecting materials for the high-melting-point-material layer and the heating conductor layer constituting the heating element from the materials described above, the temperature dependency of the rate of change in resistance of the heating element can be reduced.

The high-melting-point-material layer is composed of a material that shows a temperature dependency of the rate of change in resistance opposite to that shown by the heating conductor layer. When the rate of change in resistance of the heating conductor layer increases as the temperature increases, the high-melting-point-material layer is composed of a material in which the rate of change in resistance decreases as the temperature increases. When the rate of change in resistance of the heating conductor layer decreases as the temperature increases, the high-melting-point-material layer is composed of a material in which the rate of change in resistance increases as the temperature increases. The temperature dependency of the rate of change in resistance of the heating element can be appropriately reduced. The change in resistance due to the change in environmental temperature can be appropriately reduced. For example, the high-melting-point-material layer is composed of a platinum group element and the heating conductor layer is composed of CuNi, CuMn, NiFe, W, NiCr, or CrCu. The temperature dependency of the rate of change in resistance of the heating element can be more appropriately reduced.

Occurrence of electromigration of the heating element can be suppressed, and the temperature dependency of the rate of change in resistance can be reduced.

The increase in the resistance of the heating element due to the occurrence of electromigration can be suppressed, and the change in resistance of the heating element due to the change in environmental temperature can be decreased.

Since the change in the resistance of the heating element can be decreased, the change in the amount of heat generated from the heating element can be decreased. As a result, the fluctuation in the amount of protrusion of the surface that faces the recording medium due to thermal expansion can be decreased compared with the existing techniques.

DESCRIPTION

Figure 1:
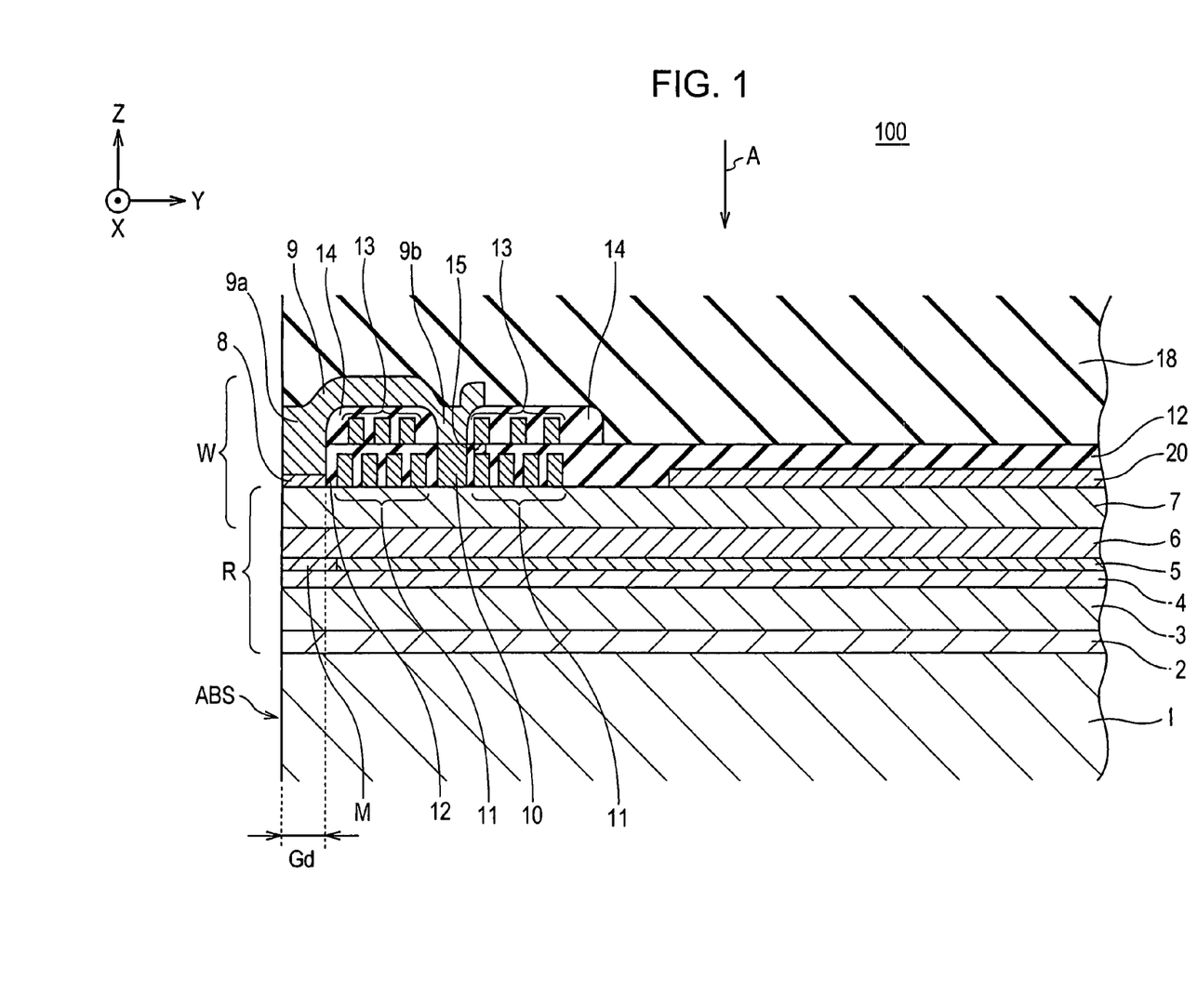
FIG. 1 is a partial cross-sectional view showing a thin film magnetic head according to an embodiment of the present invention, taken in a direction parallel to a height direction (the Y direction in the drawing) with respect to a surface facing a recording medium, for example, air bearing surface (ABS), and parallel to the thickness direction (the Z direction in the drawing)
Figure 9:
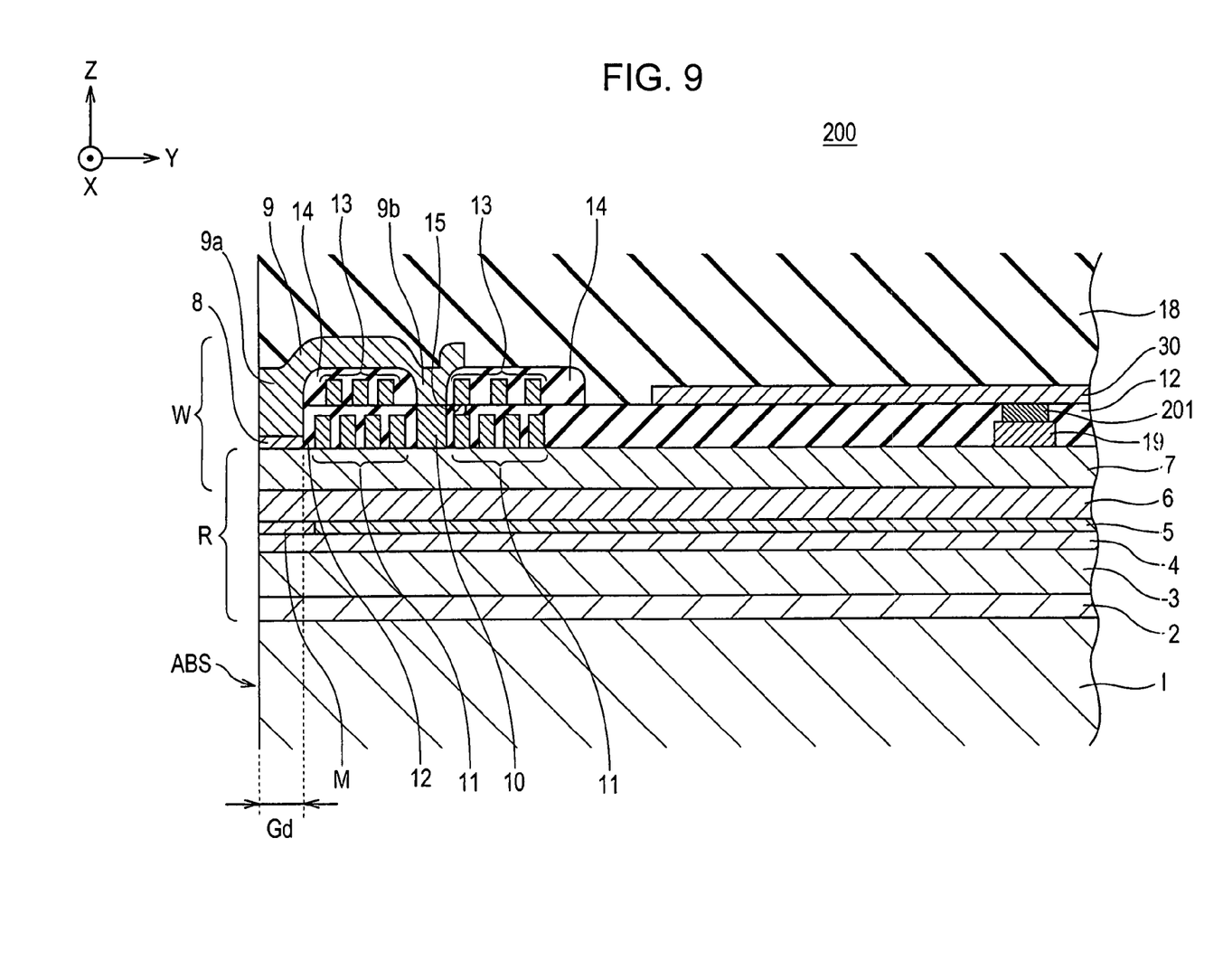
FIG. 9 is a partial cross-sectional view that shows a thin film magnetic head according to another embodiment, taken in a direction parallel to a height direction (the Y direction in the drawing) with respect to a surface that faces a recording medium and parallel to the thickness direction (the Z direction in the drawing)
Figure 10:
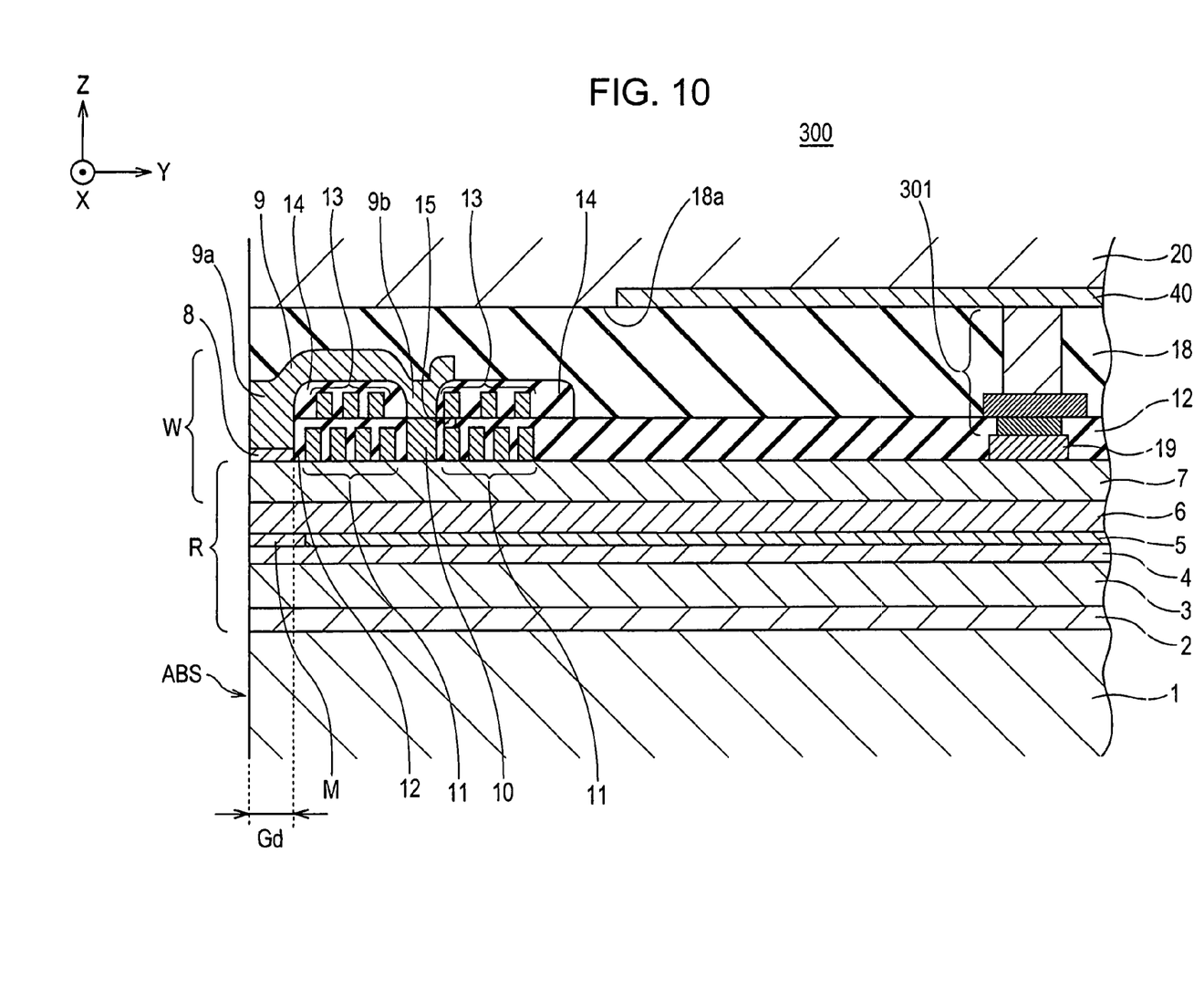
FIG. 10 is a partial cross-sectional view that shows a thin film magnetic head according to another embodiment, taken in a direction parallel to a height direction (the Y direction in the drawing) with respect to a surface that faces a recording medium and parallel to the thickness direction (the Z direction in the drawing)

The thin film magnetic heads according to the embodiments shown in FIGS. 1, 9, and 10 are each a "combined-type thin film magnetic head" in which a read head R and a write head W are stacked on each other.

FIG. 1 is a partial cross-sectional view showing a thin film magnetic head 100 according to a first embodiment of the present invention.

As shown in FIG. 1, an alumina undercoat layer 2, a lower shield layer 3, a lower gap layer 4, a magnetoresistive element M are disposed in that order on a substrate (slider) 1. The substrate 1 is composed of a ceramic material, such as alumina-titanium carbide. The lower shield layer 3 is composed of a soft magnetic material, such as permalloy, and the lower gap layer 4 is composed of a nonmagnetic nonconductive material, for example, alumina.

The magnetoresistive element M is exposed to a surface facing a recording medium (hereinafter referred to as an air bearing surface or ABS). When current is applied through electrode layers 5 that are connected to both ends in the track width direction, the resistance changes under the influence of a leakage magnetic field from the recording medium. The thin film magnetic head 100 reads the magnetic signal recorded in the recording medium based on the change in resistance in the magnetoresistive element M. As the magnetoresistive element M, a giant magnetoresistive (GMR) element (CIP-GMR or CPP-GMR), an anisotropic magnetoresistive (AMR) element, or a tunnel magnetoresistive (TuMR) element can be used.

Figure 2:
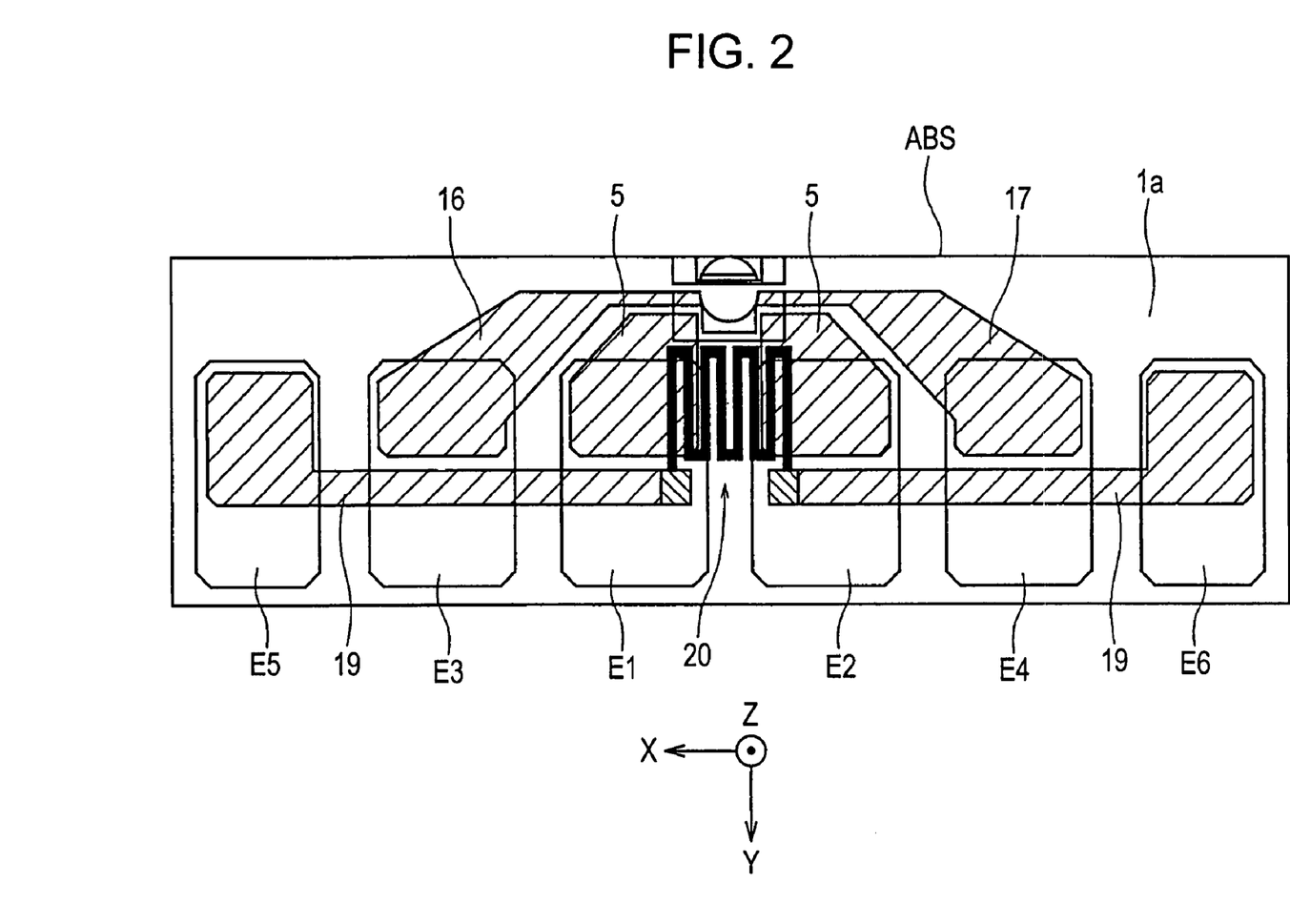
FIG. 2 is a partial perspective view of the thin film magnetic head shown in FIG. 1, viewed from a direction indicated by an arrow A in FIG. 1.

As shown in FIG. 2, the electrode layers 5 are in contact with both ends in the track width direction (the X direction) of the magnetoresistive element M, extend from the ABS in the height direction (the Y direction), and are electrically connected to electrode pad layers E1 and E2 on an end face 1a of the substrate 1. The electrode layers 5 and the electrode pad layers E1 and E2 are each composed of a conductive material that have low electrical resistance, for example, Cu or Au.

An upper shield layer 7 is disposed over the magnetoresistive element M and the electrode layers 5 with an upper gap layer 6 therebetween. The upper shield layer 7 is composed of a soft magnetic material, for example, permalloy. The upper gap layer 6 is composed of a nonmagnetic material, for example, alumina. Although not shown in the drawing, an insulating layer is disposed around the upper shield layer 7.

The structure includes the lower shield layer 3 to the upper shield layer 7 corresponds to a read head R. In the thin film magnetic head 100, the upper shield layer 7 of the read head R also serves as a lower core layer of a write head W.

A magnetic gap layer 8 exposed to the ABS is provided on the lower core layer 7. The dimension in the height direction (the Y direction) of the magnetic gap layer 8 defines a gap depth Gd of the thin film magnetic head 100. The magnetic gap layer 8 is composed of a nonmagnetic material.

A magnetic coupling portion 10 that is located at the back in the height direction of the magnetic gap layer 8 and that magnetically couples the lower core layer 7 to an upper core layer 9. A first coil layer 11 is spirally wound around the magnetic coupling portion 10. A first nonmagnetic insulating layer 12 fills the spaces between the individual conductive portions of the first coil layer 11 and covers the upper surface of the first coil layer 11 are disposed on the lower core layer 7. The upper surface of the magnetic coupling portion 10 and the upper surface of the first nonmagnetic insulating layer 12 are flush with each other.

A second coil layer 13 is spirally wound in a direction opposite to the direction of winding of the first coil layer 11. A second nonmagnetic insulating layer 14 fills the spaces between the individual conductive portions of the second coil layer 13 and which covers the upper surface of the second coil layer 13 are disposed on the first nonmagnetic insulating layer 12. The first coil layer 11 and the second coil layer 13 are conductively connected to each other via a contact portion 15 which passes through the first nonmagnetic insulating layer 12, and as shown in FIG. 2, are electrically connected to electrode pads E3 and E4 located on the end face 1a of the substrate 1 through a first coil lead layer 16 and a second coil lead layer 17. The first coil lead layer 16 and the second coil lead layer 17 are formed, for example, on the same surface as the first coil layer-forming surface, by plating simultaneously during the formation of the first coil layer 11 by plating. The second coil lead layer 17 is conductively connected to the second coil layer 13 via a contact portion (not shown) which passes through the first nonmagnetic insulating layer 12.

The magnetic coupling portion 10 is composed of a soft magnetic material, for example, permalloy. The first nonmagnetic insulating layer 12 and the second nonmagnetic insulating layer 14 are each composed of, for example, alumina. The first coil layer 11, the second coil layer 13, the contact portion 15, the first coil lead layer 16, the second coil lead layer 17, and the electrode pad layers E3 and E4 are each composed of a conductive material having low electrical resistance, for example, Cu.

An upper core layer 9 is disposed on the second nonmagnetic insulating layer 14, the upper core layer 9 being in contact with the magnetic gap layer 8 at a front end 9a exposed to the ABS and being in contact with the magnetic coupling portion 10 at a base end 9b at the back in the height direction of the ABS. Although not shown in the drawing, the width of the front end 9a of the upper core layer 9 is decreased so as to correspond to the track width. The upper core layer 9 is composed of a soft magnetic material, such as permalloy.

The structure including the lower core layer 7 to the upper core layer 9 corresponds to a write head W. The upper surfaces of the upper core layer 9 and the second nonmagnetic insulating layer 14 are covered with an insulating protective layer 18.

The configuration of the write head W is not limited to that shown in FIG. 1. For example, a vertical magnetic recording head may be used.

The thin film magnetic head 11 further includes a heating element 20 located at the back in the height direction of the write head W. The heating element 20 will be described in detail below.

The heating element 20 extends in the height direction on the same plane on which the magnetic gap layer 8 is disposed (on the lower core layer 7), and generates heat when current is applied through the electrode pad layers E5 and E6 and lead layers 19 for the heating element use. The electrode pad layers E5 and E6 and the lead layers 19 for the heating element use are each composed of a conductive material having low electrical resistance, such as Cu.

Figure 3:
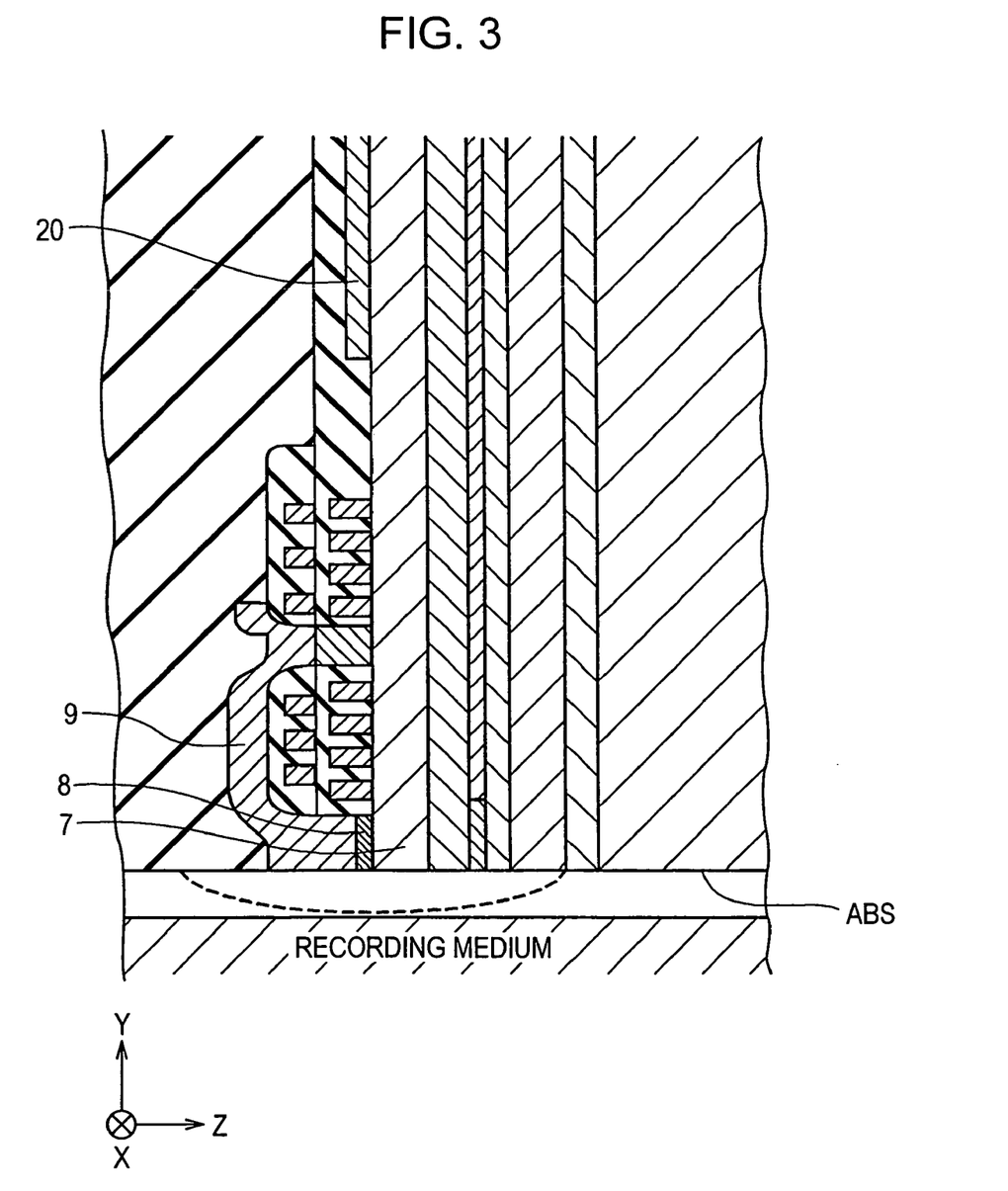
FIG. 3 is a partial sectional view that shows a state in which the surface facing the recording medium protrudes when current is applied to a heating element disposed inside the thin film magnetic head shown in FIG. 1.

Heat generated from the heating element 20 is transmitted inside the write head W and the read head R toward the ABS, and then warms, in a concentrated manner, the magnetic gap layer 8 and its vicinity (the lower core layer 7 and the upper core layer 9) which are desired to protrude toward the recording medium. As a result, the lower core layer 7, the magnetic gap layer 8, the upper core layer 9, and the like which have a higher coefficient of thermal expansion than that of the insulating protective layer 18 are thermally expanded. As indicated by a dotted line in FIG. 3, the air bearing surfaces of the write head W and the read head R protrude toward the recording medium. When the air bearing surfaces of the write head W and the read head R protrude toward the recording medium in such a manner, the distance between the magnetic gap layer 8 and the recording medium decreases. Thus, the output during writing can be improved, and the sensitivity during reading can be improved.

Figure 4:
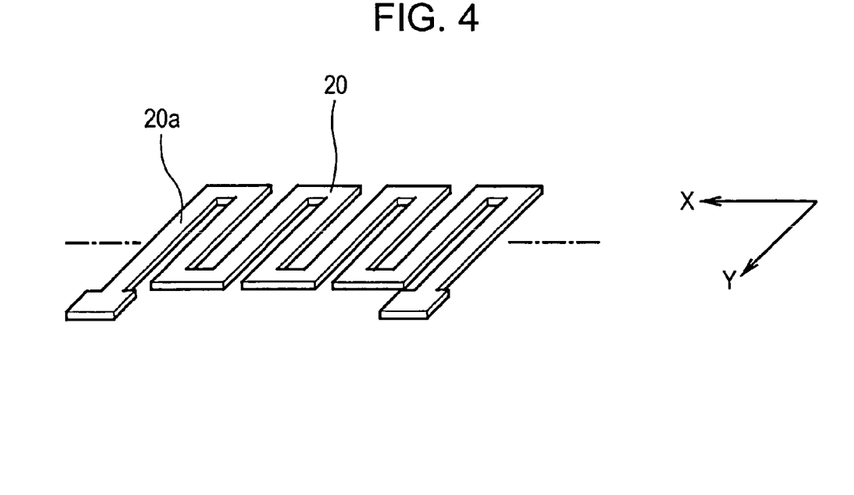
FIG. 4 is a perspective view that shows an example of a pattern of the shape of a heating element.

An example of the planar shape of the heating element 20 is a meander pattern in which, as shown in FIGS. 2 and 4, the individual ends of a plurality of heating pieces 20a extending in the Y direction with a predetermined distance therebetween in the X direction are linked to form a meandering conductive wire.

Figure 5:
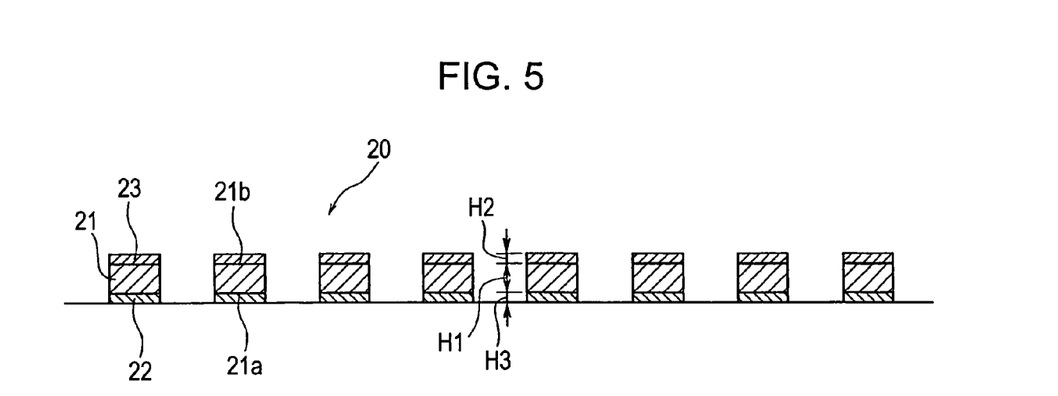
FIG. 5 is a partial sectional view of the heating element, taken in the thickness direction and along the dotted-chain line shown in FIG. 4.

As shown in FIG. 5, the heating element 20 is formed in a layered structure. The heating element 20 has a layered structure including a heating conductor layer 21. A lower high-melting-point-material layer 22 is disposed on a lower surface 21a of the heating conductor layer 21. An upper high-melting-point-material layer 23 is disposed on an upper surface 21b of the heating conductor layer 21.

Each of the lower high-melting-point-material layer 22 and the upper high-melting-point-material layer 23 is composed of a material having a melting point higher than that of the heating conductor layer 21.

The heating conductor layer 21 is composed of, for example, NiFe, CuNi, CuMn, W, NiCr, or CrCu. Note that the temperature coefficient of resistance (TCR) can be obtained from the change in resistance with temperature. The expression "the temperature dependency of the rate of change in resistance can be reduced" means in other words that the absolute value of the temperature coefficient of resistance (TCR) can be reduced. The unit of the temperature coefficient of resistance (TCR) is ppm/° C.

Each of the lower high-melting-point-material layer 22 and the upper high-melting-point-material layer 23 is composed of at least one element selected from the group consisting of, for example, platinum group elements (Ru, Rh, Pd, Os, Ir, and Pt), Ta, Ti, Cr, Nb, and Mo. These elements have a melting point higher than that of the heating conductor layer 21 composed of any one of NiFe, CuNi, and CuMn.

By disposing the lower high-melting-point-material layer 22 and the upper high-melting-point-material layer 23 on the lower surface 21a and the upper surface 21b of the heating conductor layer 21 as described above, electromigration of the heating conductor layer 21 can be suppressed.

Figure 6:
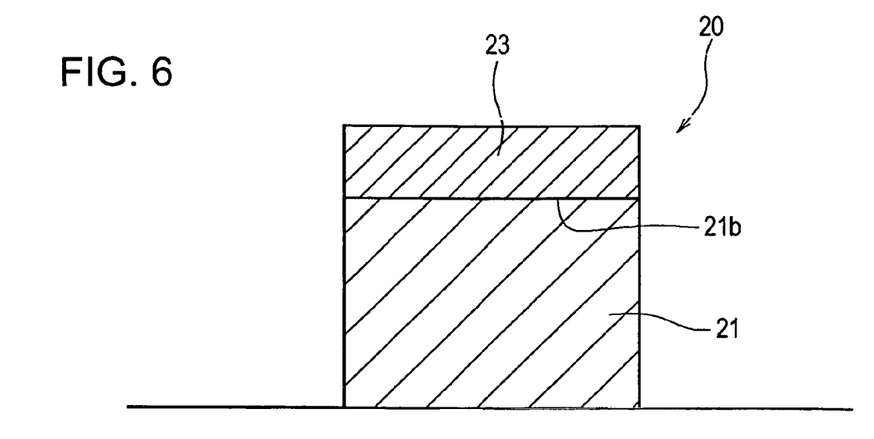
FIG. 6 is an enlarged partial sectional view that shows the heating element having a cross-section with a different shape from that shown in FIG. 5.

As described in FIG. 6, the heating element 20 may have a layered structure including the heating conductor layer 21 and the upper high-melting-point-material layer 23 or a layered structure including the heating conductor layer 21 and the lower high-melting-point-material layer 22. The structure in which a high-melting-point-material layer is disposed on the upper surface 21b and/or the lower surface 21a can be easily formed, thus being preferable.

Figure 7:
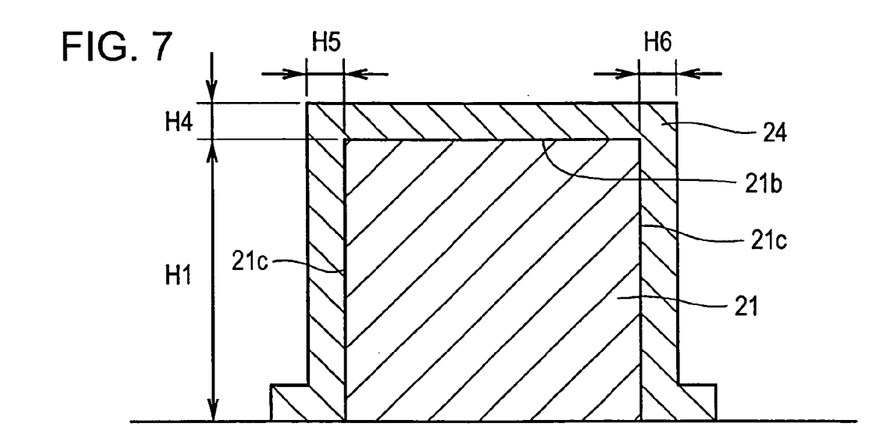
FIG. 7 is an enlarged partial sectional view that shows the heating element having a cross-section with a different shape from that shown in FIG. 5.

As shown in FIG. 7, by disposing a high-melting-point-material layer 24 so as to cover the upper surface 21b and sides 21c of the heating conductor layer 21, electromigration of the heating conductor layer 21 can be more appropriately suppressed.

Figure 8:
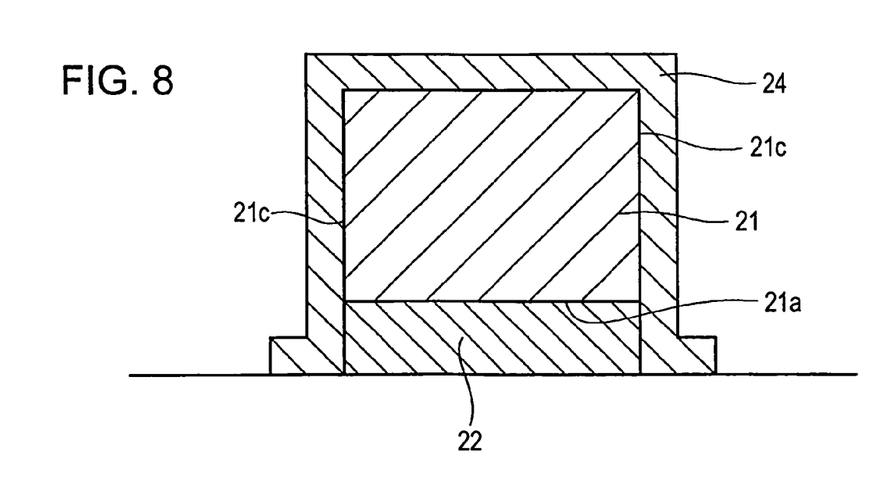
FIG. 8 is an enlarged partial sectional view that shows the heating element having a cross-section with a different shape from that shown in FIG. 5.

As shown in FIG. 8, if a lower high-melting-point-material layer 22 is disposed on the lower surface 21a of the heating conductor layer 21 and a high-melting-point-material layer 24 is disposed so as to cover the sides 21c and the upper surface 21b, the entire periphery of the heating conductor layer 21 can be surrounded by the high-melting-point-material layers 22 and 24. Thus, electromigration of the heating conductor layer 21 can be suppressed more efficiently.

In the embodiment shown in FIG. 5, the portion in which the heating conductor layer 21 and the high-melting-point-material layers 22 and 23 are laminated extends over the entire heating element 20. If a portion in which the heating conductor layer 21 and the high-melting-point-material layers 22 and 23 are laminated is present at least partially in the heating element 20, electromigration of the heating conductor layer 21 can be suppressed compared with the existing technique in which no high-melting-point-material layer is provided. The layered structure including the heating conductor layer 21 and the high-melting-point-material layers 22 and 23 is present in the entire heating element 20 from the standpoint that electromigration can be effectively suppressed.

Preferably, each of the high-melting-point-material layers 22 to 24 is composed of a material showing a temperature dependency of the rate of change in resistance opposite to that shown by the heating conductor layer 21. When the rate of change in resistance of the heating conductor layer 21 increases as the temperature increases, the rate of change in resistance of each of the high-melting-point-material layers 22 to 24 decreases as the temperature increases. When the rate of change in resistance of the heating conductor layer 21 decreases as the temperature increases, the rate of change in resistance of each of the high-melting-point-material layers 22 to 24 increases as the temperature increases.

When the heating conductor layer 21 is composed of CuNi, the rate of change in resistance of the heating conductor layer 21 gradually decreases as the temperature increases. Therefore, each of the high-melting-point-material layers 22 to 24 is composed of a material in which the rate of change in resistance gradually increases as the temperature increases. The temperature dependency of the rate of change in resistance of the heating element 20 as a whole is decreased compared with a case in which the heating conductor layer 21 is composed of a single layer.

When the heating conductor layer 21 is composed of any one of CuNi, CuMn, NiFe, W, NiCr, and CrCu, preferably, each of the high-melting-point-material layers 22 to 24 is composed of at least one platinum group element selected from the group consisting of Ru, Rh, Pd, Os, Ir, and Pt. Thereby, the temperature dependency of the rate of change in resistance of each of the high-melting-point-material layers 22 to 24 can be set opposite to that of the heating conductor layer 21.

The temperature dependency of the rate of change in resistance of each of the high-melting-point-material layers 22 to 24 is higher than that of the heating conductor layer 21. That is, the fluctuation in the rate of change in resistance with respect to an increase in temperature in each of the high-melting-point-material layers 22 to 24 is larger than that in the heating conductor layer 21, and the resistance of the high-melting-point-material layers 22 to 24 changes more sensitively than the resistance of the heating conductor layer 21. Consequently, for example, if each of the high-melting-point-material layers 22 to 24 is formed with the same thickness as that of the heating conductor layer 21, the influence of the high-melting-point-material layers 22 to 24 becomes excessively large. There is a possibility that the temperature dependency of the rate of change in resistance may become higher than that of the existing case in which the heating conductor layer 21 is composed of a single layer. Therefore, in order to decrease the influence of the high-melting-point-material layers 22 to 24 on the temperature dependency of the rate of change in resistance, as shown in FIG. 5, preferably, the thickness H1 of the heating conductor layer 21 is set larger than the total thickness (H2+H3) of the high-melting-point-material layers 22 and 23. Furthermore, as shown in FIGS. 7 and 8, when the high-melting-point-material layer is also disposed on the sides 21c of the heating conductor layer 21, preferably, the total thickness of the high-melting-point-material layer is calculated, by adding the thicknesses of the high-melting-point-material layer 24 disposed on the sides 21c, as H4+H5+H6, and adjustment is made so that the thickness H1 of the heating conductor layer 21 is larger than the total thickness of the high-melting-point-material layer 24.

For example, when the heating conductor layer 21 is composed of CuNi and each of the high-melting-point-material layers 22 to 24 is composed of Ru, preferably, the total thickness of the high-melting-point-material layers 22 to 24 is in the range of 100 to 400 Å, the thickness of the heating conductor layer 21 is in the range of 2,700 to 1,800 Å, and adjustment is made so that as the total thickness of the high-melting-point-material layers 22 to 24 increases, the thickness of the heating conductor layer 21 gradually (linearly) decreases, from the standpoint that the resistance with respect to a change in temperature can be set substantially constant. Additionally, when the heating conductor layer 21 includes two or more layers, the total thickness thereof is to be compared.

In a thin film magnetic head 200 shown in FIG. 9, in place of the heating element 20 shown in FIG. 1, a heating element 30 extends in the height direction (the Y direction in the drawing) on the same plane on which the upper core layer 9 is disposed (on the first nonmagnetic insulating layer 12). The heating element 30 has the same planar shape and the same layered structure as those of the heating element 20 described with reference to FIG. 1.

As shown in FIG. 9, the heating element 30 is electrically connected to the lead layer 19 for the heating element use shown in FIG. 2 via a conductive contact portion 201 passing through the first nonmagnetic insulating layer 12, and generates heat when current is applied through the lead layer 19 and the electrode pad layers E5 and E6. When the heating element 30 generates heat, most of the heat generated is transmitted from the heating element 30 to the ABS sides of a write head W and a read head R, and then warms, in a concentrated manner, the upper core layer 9 located on the same plane on which the heating element 30 is disposed and its vicinity (a magnetic gap layer 8 and a lower core layer 7). As a result, the upper core layer 9, the magnetic gap layer 8, the lower core layer 7, and the like which have a higher coefficient of thermal expansion than that of an insulating protective layer 18 are thermally expanded, and the air bearing surfaces of the write head W and the read head R protrude toward the recording medium.

In a thin film magnetic head 300 shown in FIG. 10, a surface 18a of an insulating protective layer 18 is planarized, and in place of the heating element 20 or 30 shown in FIG. 1 or FIG. 9, a heating element 40 extends in the height direction (the Y direction in the drawing) on the surface 18a of the insulating protective layer 18. The heating element 40 has the same planar shape and the same layered structure as those of the heating element 20 described with reference to FIG. 1.

The heating element 40 is electrically connected to the lead layer 19 for the heating element use shown in FIG. 2 via a conductive contact portion 301 passing through the insulating protective layer 18 and a first nonmagnetic insulating layer 12, and generates heat when current is applied through the lead layer 19 and the electrode pad layers E5 and E6. Heat generated from the heating element 40 is transmitted from the heating element 40 to the ABS sides of a write head W and a read head R, and then warms, in a concentrated manner, an upper core layer 9 covered with the insulating protective layer 18 and its vicinity (a magnetic gap layer 8 and a lower core layer 7). As a result, the upper core layer 9, the magnetic gap layer 8, the lower core layer 7, and the like which have a higher coefficient of thermal expansion than that of the insulating protective layer 18 are thermally expanded, and the air bearing surfaces of the write head W and the read head R protrude toward the recording medium.

The heating elements 20, 30, and 40 may be disposed at positions other than those shown in FIGS. 1, 9, and 10.

In the thin film magnetic head according to any of the embodiments described above, since the heating element is formed in a layered structure including a heating conductor layer and a high-melting-point-material layer having a melting point higher than that of the heating conductor layer, occurrence of electromigration in the heating conductor layer can be appropriately suppressed. Furthermore, by forming the high-melting-point-material layer using a material showing a temperature dependency of the rate of change in resistance opposite to that shown by the heating conductor layer, it is possible to reduce the temperature dependency of the rate of change in resistance in the heating element 20, 30, or 40 compared with the existing technique.

Consequently, it is possible to suppress an increase in the resistance of the heating element 20, 30, or 40 due to the occurrence of electromigration or a change in the resistance of the heating element 20, 30, or 40 due to a change in environmental temperature. Since the change in the resistance of the heating element 20, 30, or 40 can be decreased as described above, it is possible to decrease the change in the amount of heat generated from the heating element 20, 30, or 40. Therefore, the fluctuation in the amounts of thermal expansion of the upper core layer 9, the magnetic gap layer 8, and the lower core layer 7 can be reduced, and thus the fluctuation in the amount of protrusion of the ABS toward the recording medium can be reduced compared with the existing technique.

EXAMPLES

In each experiment, a heating element 20 shown in FIG. 4 was formed and the heating element 20 was incorporated into a thin film magnetic head shown in FIG. 1. Then, the relationship between the current application time and the rate of change in resistance of the heating element 20 was examined. In the experiment shown in each of FIGS. 11 to 14, the environmental temperature was set at 20° C. and the current was set at 40 mA.

Herein, the term "rate of change in resistance" is defined as a ratio of a change from a reference resistance to the reference resistance, the reference resistance being the resistance of the heating element 20 at a current application time of 0. That is, the rate of change in resistance (%) is equal to [(resistance (x)−reference resistance)/reference resistance]×100, wherein the resistance (x) is the resistance of the heating element 20 at a current application time of x.

Figure 11:
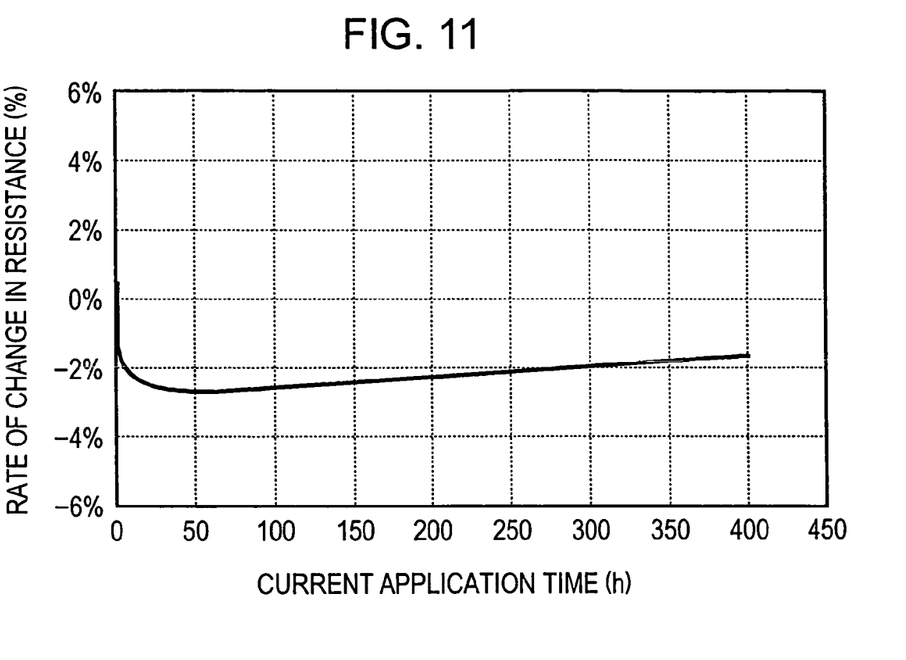
FIG. 11 is a graph that shows the relationship between the current application time and the rate of change in resistance when a heating element is formed in a layered structure of Ru (200 Å)/NiCu (2,000 Å)/Ru (200 Å)

FIG. 11 shows the experimental results when the heating element 20 was formed in a layered structure of Ru (200 Å)/NiCu (2,000 Å)/Ru (200 Å). As is evident from FIG. 11, even if the current application time is increased, the absolute value of the rate of change in resistance is not significantly increased.

Figure 12:
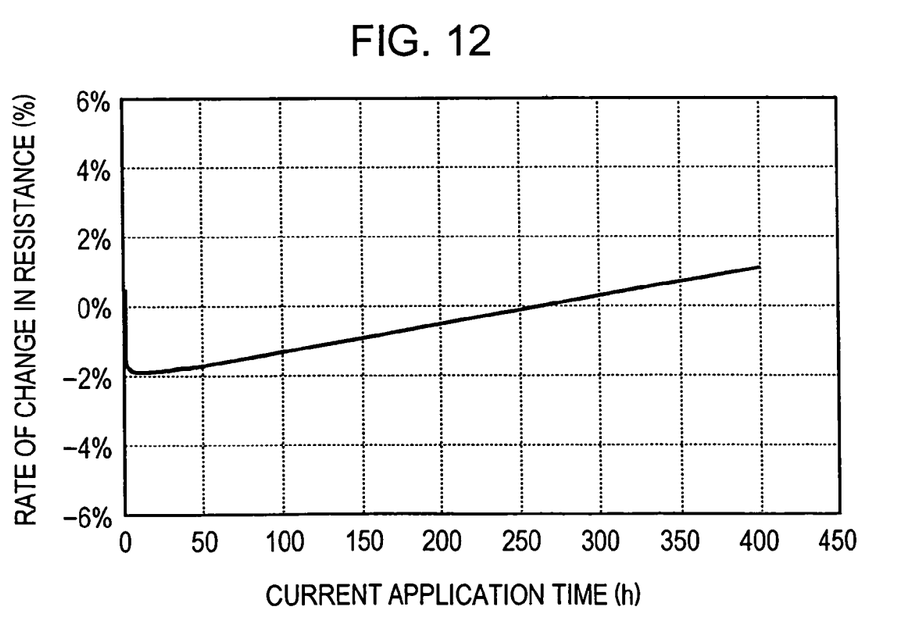
FIG. 12 is a graph that shows the relationship between the current application time and the rate of change in resistance when a heating element is formed in a layered structure of Ta (100 Å)/NiCu (2,800 Å)/Ta (100 Å)
Figure 13:
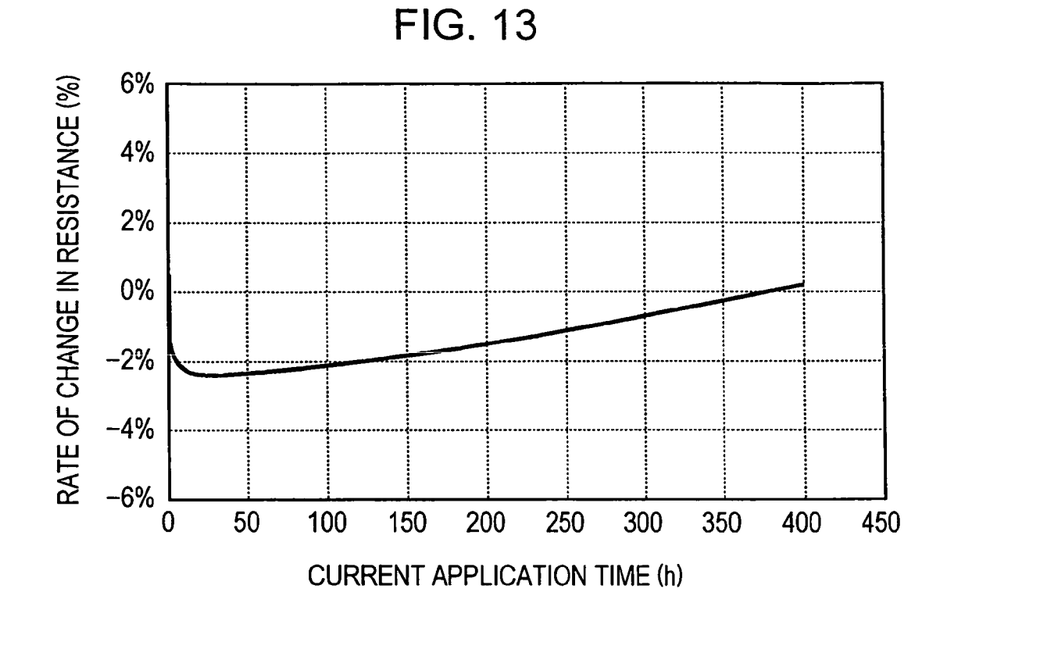
FIG. 13 is a graph that shows the relationship between the current application time and the rate of change in resistance when a heating element is formed in a layered structure of NiCu (2,800 Å)/Ta (500 Å)

FIG. 12 shows the experimental results when the heating element 20 was formed in a layered structure of Ta (100 Å)/NiCu (2,800 Å)/Ta (100 Å). FIG. 13 shows the experimental results when the heating element 20 was formed in a layered structure of NiCu (2,800 Å)/Ta (500 Å). As is evident from FIGS. 12 and 13, even if the current application time is increased, the absolute value of the rate of change in resistance is not significantly increased as in FIG. 11. As is evident form the experimental results shown in FIGS. 11 to 13, even if the current application time is increased to about 400 hours, the fluctuation of the absolute value of the rate of change in resistance is within about 2%.

Figure 14:
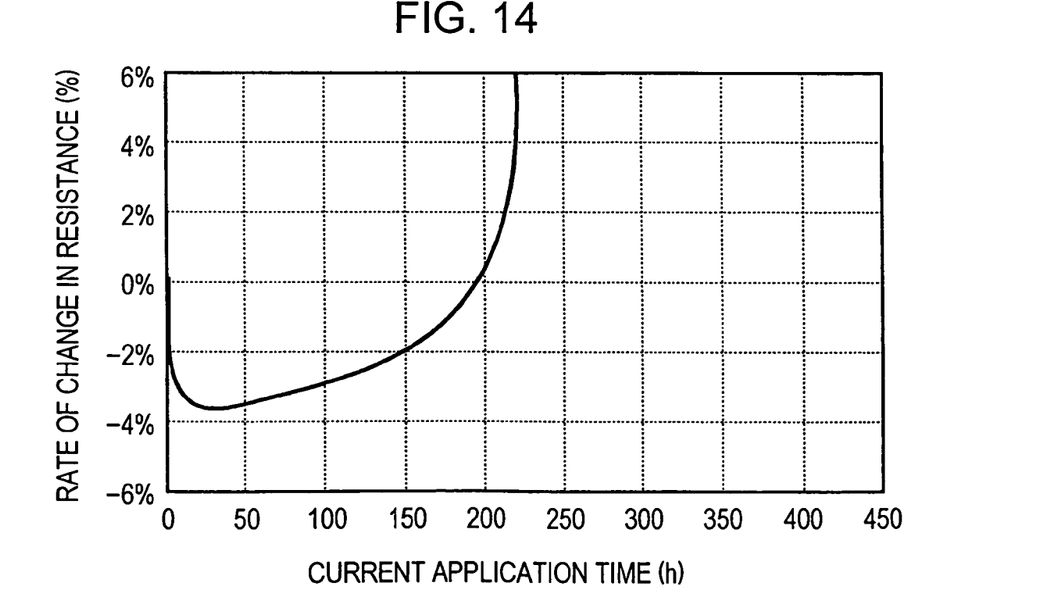
FIG. 14 is a graph that shows the relationship between the current application time and the rate of change in resistance when a heating element is formed in a single layer of NiCu (3,000 Å)

On the other hand, FIG. 14 shows the experimental results when the heating element was formed in a single layer of NiCu (3,000 Å). As is evident from FIG. 14, when the current application time exceeds 50 hours, the resistance of the heating element having a decreasing tendency with respect to the reference resistance gradually increases, and when the current application time exceeds 200 hours, the resistance of the heating element exceeds the reference resistance and the rate of change in resistance has a positive value and abruptly increases.

The reason for this is believed to be that electromigration occurred in the heating element in the case of FIG. 14. On the other hand, by forming the heating element 20 by depositing Ru or Ta having a melting point higher that that of NiCu on a NiCu layer, instead of in the form of a single layer of NiCu, occurrence of electromigration in the heating element 20 can be suppressed. As a result, as shown in FIGS. 11 to 13, even if the current application time is increased, the absolute value of the rate of change in resistance can be reduced.

Next, thin films composed of NiCu (3,000 Å), Ru (50 Å)/NiCu (2,700 Å)/Ru (50 Å), Ru (100 Å)/NiCu (2,500 Å)/Ru (100 Å), Ru (200 Å)/NiCu (2,000 Å)/Ru (200 Å), and Ru (1,000 Å) were formed, and with respect to each thin film, the rate of change in resistance was measured when environmental temperature was gradually increased. The current applied to each thin film was set at 10 mA and the rate of change in resistance at the current application time of 1 hour was measured. The resistance at 25° C. was set to be the reference resistance of the rate of change in resistance, and the rate of change in resistance at environmental temperature y (° C.) was calculated according to the formula: (resistance (y)/reference resistance)×100(%). The experimental results thereof are shown in FIG. 15.

Figure 15:
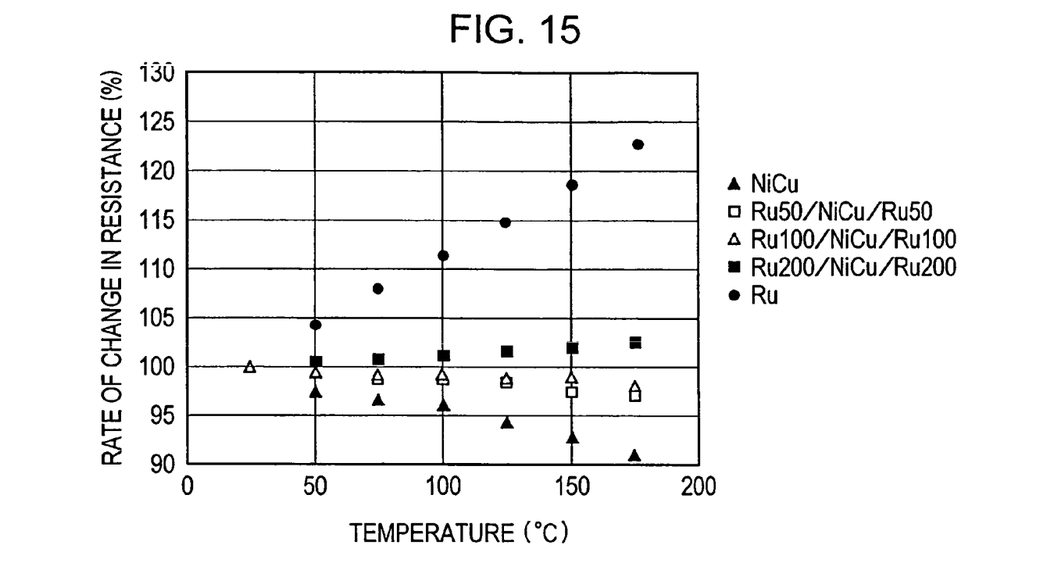
FIG. 15 is a graph that shows the relationship between the temperature and the rate of change in resistance with respect to each of the thin films, for example, NiCu (3,000 Å), Ru (50 Å)/NiCu (2,700 Å)/Ru (50 Å), Ru (100 Å)/NiCu (2,500 Å)/Ru (100 Å), Ru (200 Å)/NiCu (2,000 Å)/Ru (200 Å), and Ru (1,000 Å)

As is evident from FIG. 15, the rate of change in resistance of NiCu gradually decreases as the temperature increases. On the other hand, the rate of change in resistance of Ru gradually increases as the temperature increases. Thus, NiCu shows a temperature dependency of the rate of change in resistance opposite to that shown by Ru. It is also evident that NiCu has a lower temperature dependency of the rate of change in resistance than Ru. For example, at an environmental temperature of 100° C., the rate of change in resistance of Ru is about 112% with a change in resistance of about 12%, while the rate of change in resistance of NiCu is about 96% with a change in resistance of about 4%. Thus, the resistance of NiCu does not easily change with temperature compared with Ru.

Consequently, when a laminate of NiCu and Ru is formed, by setting the thickness of the NiCu layer larger than the thickness of the Ru layer so as to decrease the influence of Ru having a tendency of increasing the rate of change in resistance as the temperature increases, it is possible to substantially equalize the influence of NiCu having a tendency of decreasing the rate of change in resistance as the temperature increases to the influence of Ru having the opposite tendency with respect to the entire laminate. Thereby, the temperature dependency of the rate of change in resistance of the entire laminate of NiCu and Ru can be decreased more appropriately.

As shown in FIG. 15, in the layered structure of Ru (50 Å)/NiCu (2,700 Å)/Ru (50 Å), the total thickness of the Ru layers is 100 Å and the thickness of the NiCu layer is 2,700 Å. In the layered structure of Ru (100 Å)/NiCu (2,500 Å)/Ru (100 Å), the total thickness of the Ru layers is 200 Å and the thickness of the NiCu layer is 2,500 Å. In the layered structure of Ru (200 Å)/NiCu (2,000 Å)/Ru (200 Å), the total thickness of the Ru layers is 400 Å and the thickness of the NiCu layer is 2,000 Å. Thus, in each of the laminates, the thickness of the NiCu layer is larger than the total thickness of the Ru layers. As is evident from FIG. 15, the slope of the rate of change in resistance with respect to the increase in temperature of each laminate is gentler than the slope of the rate of change in resistance with respect to the increase in temperature of NiCu or Ru. Therefore, the temperature dependency of the rate of change in resistance of each laminate is lower than that of NiCu or Ru.

Next, thin films composed of NiCu (3,000 Å), Ta (100 Å)/NiCu (2,800 Å)/Ta (100 Å), Ru (100 Å)/NiCu (2,800 Å)/Ru (100 Å), and Ru (1,500 Å) were formed, and with respect to each thin film, the rate of change in resistance was measured when environmental temperature was gradually increased. The current applied to each thin film was set at 10 mA and the rate of change in resistance at the current application time of 1 hour was measured. The resistance at 25° C. was set to be the reference resistance of the rate of change in resistance, and the rate of change in resistance at environmental temperature y (° C.) was calculated according to the formula: (resistance (y)/reference resistance)×100(%). The experimental results thereof are shown in FIG. 16.

Figure 16:
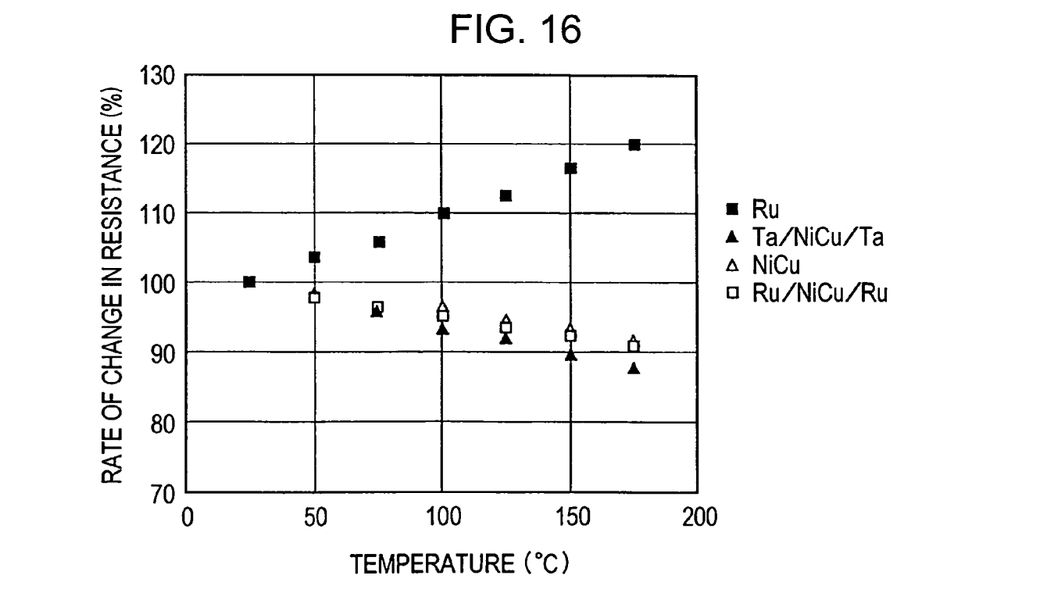
FIG. 16 is a graph that shows the relationship between the temperature and the rate of change in resistance with respect to each of the thin films, for example, NiCu (3,000 Å), Ta (100 Å)/NiCu (2,800 Å)/Ta (100 Å), Ru (100 Å)/NiCu (2,800 Å)/Ru (100 Å), and Ru (1,500 Å)

As is evident from FIG. 16, the temperature dependency of the rate of change in resistance of the laminate of Ta (100 Å)/NiCu (2,800 Å)/Ta (100 Å) is higher than that of the single layer of NiCu (3,000 Å). The rate of change in resistance of Ta/NiCu/Ta becomes lower than 100% as the temperature increases as in NiCu, and thus the temperature dependency of the rate of change in resistance of Ta has the same tendency as that of the temperature dependency of the rate of change in resistance of NiCu (i.e., as the temperature increases, the rate of change in resistance decreases).

As a result, it has been found that in order to decrease the temperature dependency of the rate of change in resistance of the heating element, it is necessary to form the heating conductor layer and the high-melting-point-material layer using materials that show opposite temperature dependencies of the rate of change in resistance and to decrease the thickness of the layer having higher temperature dependency.

Figure 17:
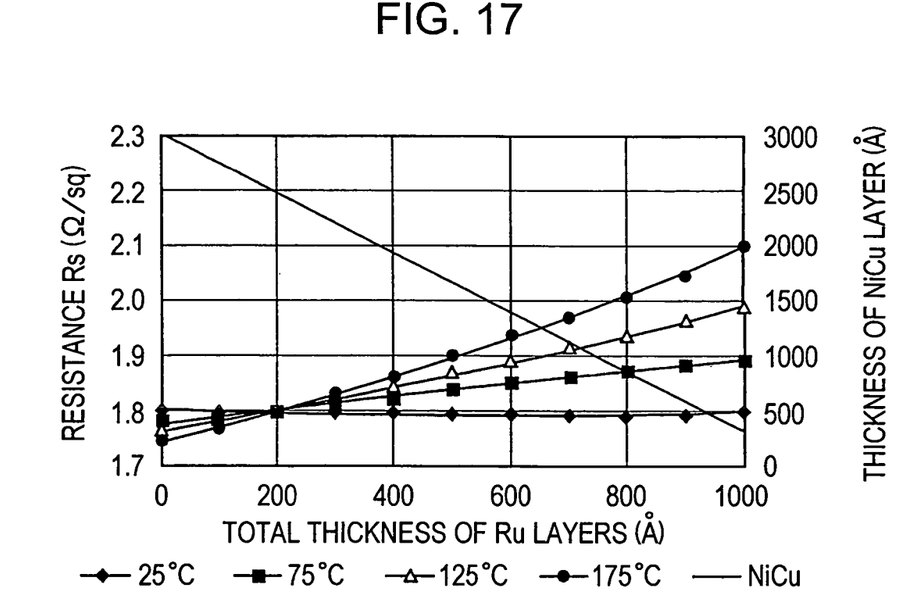
FIG. 17 is a graph that shows the change in the resistance of three-layer structures of Ru/NiCu/Ru with respect to various values of total thickness of Ru layers and various values of thickness of NiCu layers at various environmental temperatures.

In the experiment shown in FIG. 17, heating elements having a three-layer structure of Ru/NiCu/Ru were formed. The total thickness of Ru layers was increased and the thickness of the NiCu layer was decreased so that the resistance of the heating element at 25° C. was 1.8 Ω/sq. At each thickness, how the resistance changed as the temperature increased from 25° C. was measured.

As shown in FIG. 17, when the total thickness of the Ru layers is set at 200 Å and the thickness of the NiCu layer is set at about 2,500 Å, even if the temperature is changed from 25° C. to 175° C., the resistance of Ru/NiCu/Ru is substantially constant at about 1.8 Ω/sq. As shown in FIG. 17, when the total thickness of the Ru layers is gradually increased and the thickness of the NiCu layer is gradually decreased, as the environmental temperature is increased, the change in resistance increases. The reason for this is that since the temperature dependency of the rate of change in resistance of Ru is higher than that of NiCu, as the total thickness of the Ru layers is increased and the environmental temperature is increased, the influence of Ru on the resistance of the heating element increases.

As is evident from FIG. 17, by setting the total thickness of the Ru layers in the range of 100 to 400 Å and the thickness of the NiCu layer in the range of 2,700 to 1,800 Å and by adjusting the thicknesses of the Ru layers and the NiCu layer so that as the total thickness of the Ru layers increases, the thickness of the NiCu layer gradually (linearly) decreases, it is possible to form a laminate in which the change in resistance is small even if the environmental temperature changes.

Figure 18:
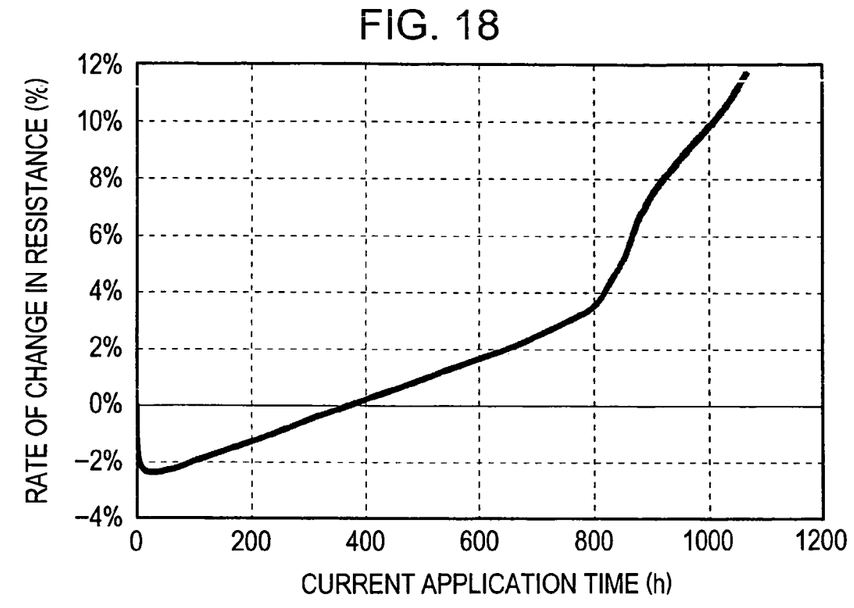
FIG. 18 is a graph that shows the relationship between the current application time and the rate of change in resistance when a heating element is formed in a layered structure of NiCu (2,800 Å)/Ta (500 Å)
Figure 19:
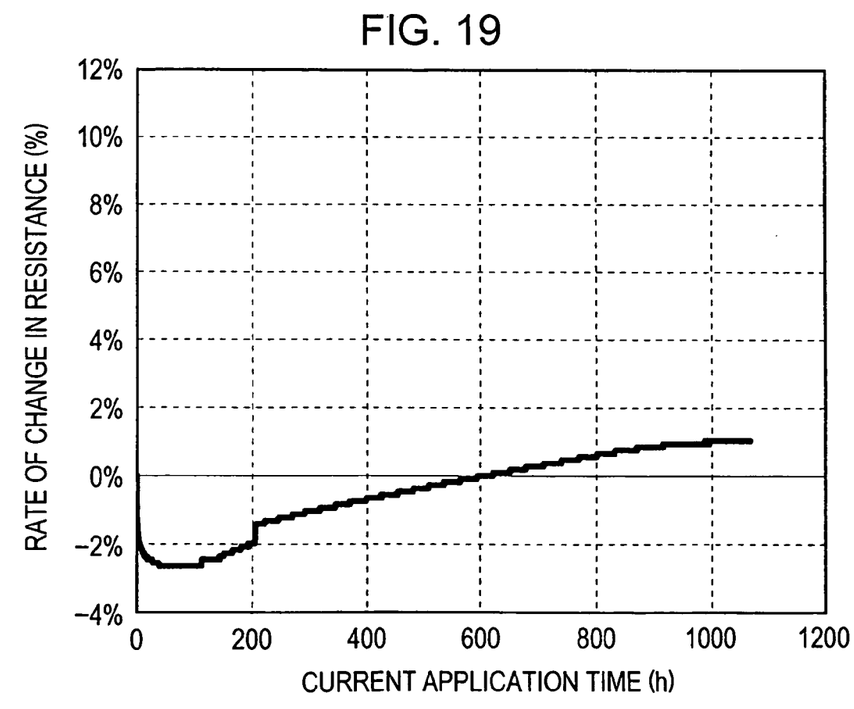
FIG. 19 is a graph that shows the relationship between the current application time and the rate of change in resistance when a heating element is formed in a layered structure of Ru (200 Å)/NiCu (2,000 Å)/Ru (200 Å).

FIG. 18 shows the experimental results when the heating element 20 was formed in a layered structure of NiCu (2,800 Å)/Ta (500 Å) as in the heating element 20 shown in FIG. 13. In FIG. 18, the current application time was increased compared with the experiment shown in FIG. 13 and the rate of change in resistance was checked. As a result, the absolute value of the rate of change in resistance tended to increase at a current application time of 800 hours. On the other hand, FIG. 19 shows the experimental results when the heating element 20 was formed in a layered structure of Ru (200 Å)/NiCu (2,000 Å)/Ru (200 Å) as in the heating element 20 shown in FIG. 11. As shown in FIG. 19, in the layered structure in which the high-melting-point-material layers are disposed on both the upper surface and the lower surface of the heating conductor layer, even if the current application time is increased to more than 800 hours, the absolute value of the rate of change in resistance is not substantially increased. As is evident from the experimental results shown in FIG. 19, even if the current application time is increased to about 1,000 hours, the fluctuation in the absolute value of the rate of change in resistance is within about 2%.

What is claimed is:

1. A thin film magnetic head comprising:
a read head and a write head; and a heating element that allows a surface of the read head and the write head that face a recording medium to protrude toward the recording medium, wherein the heating element includes a heating conductor layer and a high-melting-point-material layer disposed so as to at least partially overlap the heating conductor layer, wherein the high-melting-point-material layer has a melting point higher than that of the heating conductor layer, and wherein the high-melting-point-material layer is composed of at least one element selected from the group consisting of platinum group elements (Ru, Rh, Pd, Os, Ir, and Pt), Ta, Ti, Cr, Nb, or Mo.

2. The thin film magnetic head according to claim 1, wherein the high-melting-point-material layer is disposed on each of a lower surface and an upper surface of the heating conductor layer.

3. The thin film magnetic head according to claim 1, wherein the high-melting-point-material layer is disposed on a lower surface.

4. The thin film magnetic head according to claim 1, wherein the heating conductor layer is composed of NiCu, CuMn, NiFe, W, NiCr, or CrCu.

5. The thin film magnetic head according to claim 1, wherein the high-melting-point-material layer is disposed on an upper surface of the heating conductor layer.

6. A thin film magnetic head comprising: a read head and a write head; and a heating element that allows a surface of the read head and the write head that face a recording medium to protrude toward the recording medium, wherein the heating element includes a heating conductor layer and a high-melting-point-material layer disposed so as to at least partially overlap the heating conductor layer, wherein the high-melting-point-material layer has a melting point higher than that of the heating conductor layer, and wherein the high-melting-point-material layer is composed of a material that shows a temperature dependency of the rate of change in resistance opposite to that shown by the heating conductor layer.

7. The thin film magnetic head according to claim 6, wherein the high-melting-point-material layer is composed of a platinum group element and the heating conductor layer is composed of CuNi, CuMn, NiFe, W, NiCr, or CrCu.

8. The thin film magnetic head according to claim 6, wherein the high-melting-point-material layer is disposed on each of a lower surface and an upper surface of the heating conductor layer.

9. The thin film magnetic head according to claim 6, wherein the high-melting-point-material layer is disposed on a lower surface.

10. The thin film magnetic head according to claim 6, wherein the heating conductor layer is composed of NiCu, CuMn, NiFe, W, NiCr, or CrCu.

11. The thin film magnetic head according to claim 6, wherein the high-melting-point-material layer is disposed on an upper surface of the heating conductor layer.

* * * * *